(12) United States Patent
Aksamit et al.

(10) Patent No.: US 8,830,555 B2
(45) Date of Patent: Sep. 9, 2014

(54) DEVICE AND SYSTEM FOR REFLECTIVE DIGITAL LIGHT PROCESSING (DLP)

(75) Inventors: Slavek P. Aksamit, Austin, TX (US);
David D. Chudy, Raleigh, NC (US);
Cristian Medina, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 13/164,174

(22) Filed: Jun. 20, 2011

(65) Prior Publication Data
US 2012/0019573 A1 Jan. 26, 2012

Related U.S. Application Data

(62) Division of application No. 11/558,440, filed on Nov. 9, 2006, now Pat. No. 8,004,740.

(51) Int. Cl.
*G02F 1/153* (2006.01)
*H04N 9/31* (2006.01)
*G02B 5/23* (2006.01)
*G02F 1/15* (2006.01)

(52) U.S. Cl.
CPC .............. *H04N 9/3197* (2013.01); *G02B 5/23* (2013.01); *G02F 1/15* (2013.01); *G02F 2203/02* (2013.01); *H04N 9/3111* (2013.01)
USPC .......................................... 359/267; 359/265

(58) Field of Classification Search
USPC ............. 359/201.2, 212.1, 214.1, 223.1, 290, 359/298, 265–275
See application file for complete search history.

(56) References Cited

U.S. PATENT DOCUMENTS

| 5,623,281 | A | 4/1997 | Markandey et al. | |
|---|---|---|---|---|
| 5,745,281 | A * | 4/1998 | Yi et al. | ........................ 359/290 |
| 6,133,895 | A | 10/2000 | Huang | |
| 6,552,699 | B2 | 4/2003 | Dugdale | |
| 6,888,521 | B1 | 5/2005 | Richards | |
| 6,917,352 | B2 | 7/2005 | Makino | |
| 2005/0128560 | A1 | 6/2005 | Vincent et al. | |
| 2006/0028707 | A1 | 2/2006 | Shinozaki et al. | |
| 2006/0152456 | A1 | 7/2006 | Arnold, II | |
| 2007/0206280 | A1 | 9/2007 | May et al. | |
| 2008/0111927 | A1 | 5/2008 | Aksamit et al. | |

OTHER PUBLICATIONS

Office Action, U.S. Appl. No. 11/558,440, Nov. 16, 2009.
Office Action, U.S. Appl. No. 11/558,440, Feb. 26, 2010.
Final Office Action, U.S. Appl. No. 11/558,440, Jun. 3, 2010.
Final Office Action, U.S. Appl. No. 11/558,440, Jan. 14, 2011.
Notice of Allowance, U.S. Appl. No. 11/558,440, Apr. 15, 2011.

* cited by examiner

*Primary Examiner* — William Choi
(74) *Attorney, Agent, or Firm* — Edward J. Lenart; Katherine S. Brown; Biggers Kennedy Lenart Spraggins LLP

(57) ABSTRACT

Aspects of the present invention include systems for reflective digital light processing (DLP). Embodiments include a light source, a plurality of optically reflective switching devices each having an optically reflective layer in contact with a substrate; a circuit means and power source; controller logic; a projection means; and a display means; wherein each of said plurality of devices is a capable of receiving light from said light source and thereafter reflecting said received light in direct response to a reflective state condition of said each device.

14 Claims, 6 Drawing Sheets

DEVICE AND SYSTEM FOR REFLECTIVE DIGITAL LIGHT PROCESSING (DLP)

CROSS-REFERENCE TO RELATED APPLICATIONS

The present application is a divisional application and claims priority, under 35 U.S.C. §121, from U.S. patent application Ser. No. 11/558,440 filed Nov. 9, 2006 which is hereby incorporated by reference.

FIELD OF INVENTION

The present invention generally relates to the field of display devices and more particularly for optically reflective switching devices in display systems having very high resolution images such as reflective light valve arrays.

BACKGROUND OF THE INVENTION

Digital Light Processing (DLP) is a technology used in projectors and video projectors. In DLP applications such as image transmission systems and projectors, a DLP image is created by microscopically small mirrors that are positioned and arranged in a matrix on a semiconductor chip. The "chip" is often referred to as a Digital Micromirror Device (DMD) and is used hereinafter a "chip" or "DMD chip". Each micromirror, or as used herein "mirror," on the chip typically represents one pixel in the projected image.

FIG. 1 is a pictorial representation of a mirror 100 in a typical mirror array on a DMD. From FIG. 1, mirror 100 is positioned in proximity to other mirrors 110, 120, 130, 140 and 150 in which there exists a gap between the placement of each mirror at 111, 121, 131, 141, 151, as well as at 161. These gap areas do not reflect light as instead they are required to exist in order to permit the mirrors to angle and reposition during operation. Typically, a support post 170 of each mirror is in contact with a torsion hinge or other mechanical apparatus below the mirror (not shown) to provide the capability of the mirror's movement.

Figure 4:
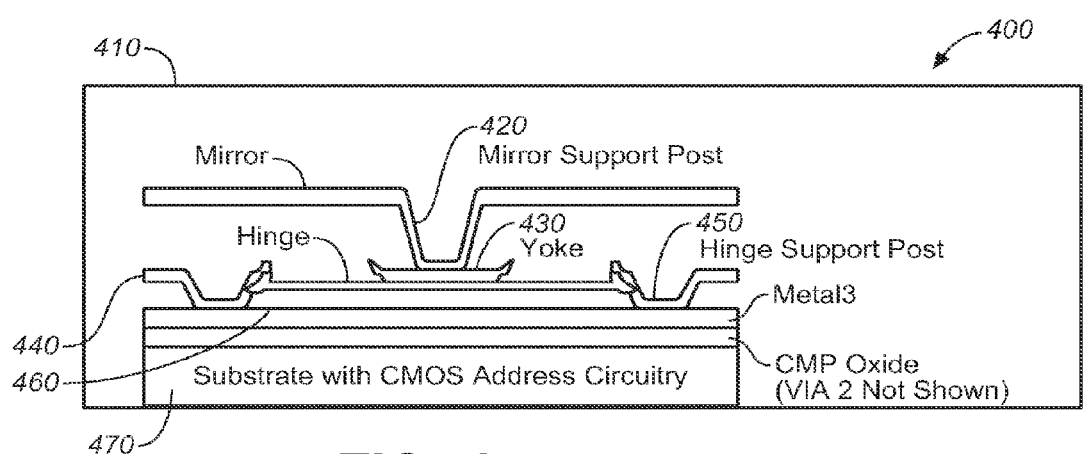

FIG. 4 is a cut-away pictorial representation of a mirror on a chip 400. From FIG. 4, mirror 410 is supported by a mirror support post 420, which is balanced on a yoke 430 that is midpoint a hinge assembly 440. As part of the hinge assembly 440, there are two hinge support posts 450 which reside upon metal contact surface 460 above the substrate 470 of the chip 400.

Figure 5:
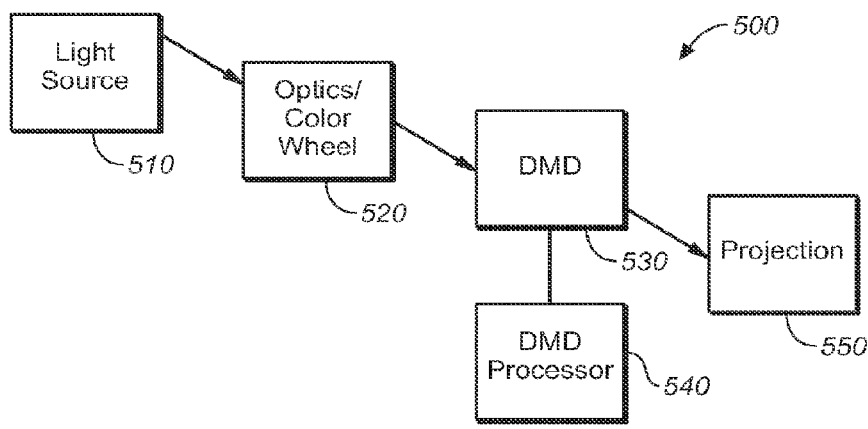

FIG. 5 represents a schematic of a typical DLP system 500. In a typical DLP system a light source 510, a color wheel 520, a chip 530 with associated processor logic (such as but not limited a command logic) 540, and a projection means such as a projection lens 550. From FIG. 5, as the white light source of 510 passes through the color wheel 520, a colored light is reflected from a mirror of the chip 530 in a predetermined manner based on its predetermined mechanical angle position as being ON or OFF, and a resulting colored light is projected through the lens 550 for viewing. In a DLP system, the mirrors on the chip may reflect an all-digital image onto a screen or other projection surface for a viewer's use.

Optically, pixels resulting from the projection, and their associated resolution, are observable by the user's eye. For instance, in FIG. 6, a traditional projection DLP display system is shown 600. From FIG. 6, the system comprises a light source 610, a color wheel 620, a mirror array 630 having, a projection lens 640 and a display screen 650. The light source 610 when emitted after passing though the color wheel 620 is received by a mirror on the array 630. The mirror on the array 630 receiving the colored light is then switched to be ON or OFF in accordance with the desired result, as predetermined, and the resulting color in relation to its angle is displayed on the display screen 650 at that moment. Thereafter, the position of the mirror is again altered and an associated color is then displayed. This process repeats itself thousands of times per second per mirror.

A DLP system will typically vary in the number of mirrors that are present on its respective chip, in view of the resolution sought for a particular system. For instance, the number of mirrors directly affects and corresponds to the resolution of the projected image, such that improved resolution characteristics require a greater number of properly positioned and aligned mirrors on the chip. Typically, resolutions are recognized as 800×600, 1024×768, 1280×720, etc., where resolutions such as 1920×1080 and greater correspond with improved visual sensitivities such as High Definition Television (HDTV). The placement and alignment of the mirrors on the DMD is critical such that the mirrors may be positioned so as to be capable of being repositioned rapidly to reflect light either through the lens, imagery device or a heatsink.

In a DLP system, the mirrors on the chip are often mounted on miniature mechanical hinges or yokes that provide tilting capability to each mirror in relation to the light source of the system and the associated electrodes providing a charge. Typically, the mirrors on the DMD are rapidly repositioned thousands of times per second by one or more electrodes resident therewith from one position to another such that as each mirror changes in angle by upwards of 20 degrees, the light reflected off of the mirror is affected and the resulting reflected light, and its associated intensity, that then passes through a color wheel of the system and eventually to the screen for viewing as a pixel is a direct result of the light reflected.

Figure 7:
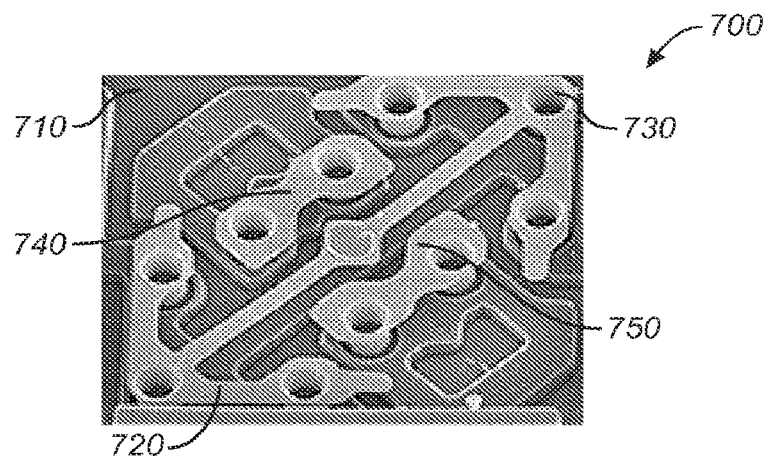

FIG. 7 is a pictorial representation of a typical mirror 710 underside having two supports (720, 730) and two electrodes (740, 750). Where a voltage source providing current to each electrode acts to decrease voltage applied to one electrode and/or acts to increases a voltage applied to the other electrode, thereby creating an imbalance between the electrostatic attraction generated between each electrode and the mirror, resulting in the mirror to effectively tilt.

In a grayscale image system, where there is no color wheel, reflected light is white, black or a shade of grey, depending on the angle of the mirror. For instance, when a mirror is angled in an "ON" position to reflect light, the resulting light reflected is one of white or a shade of gray. Contradistinctively, when a mirror is angled in an "OFF" position to not reflect light, the result is no light reflected so effectively no light, or black, is passed. Due to the speed of adjustment, visually, when a mirror is switched on more than off, it results in a reflection of a lighter-shade gray pixel, whereas when a mirror is switched on more than off, it results in a reflection of a darker-shade gray pixel. The mirrors are adjusted in relation to commands received from bit-streamed image code of the associated control module resulting in mirrors that may adjust several thousand times per second.

Generally, the movement of the mirrors in a display system includes the use of electrodes, hinges, electrostatic attraction, piezoelectric device, and thermal actuators.

In a color DLP system, the projected white light of the light source, commonly generated by a lamp, typically first traverses through a color wheel positioned prior to the chip. The color wheel filters the projected light into its color scheme, which is often at least red, green, and blue, from which a single-chip DLP projection system is known to create at least 16.7 million colors and a three-chip DLP projection system is known to be capable of producing in excess of 35 trillion colors. Reflected light from the mirrors of the chip is then passed for projection onto a viewing surface where, for example, the color orange (or orange hue) results from a viewer's eye observing red and yellow light simultaneously as a result of rapidly alternating flashes.

As can be appreciated reliable, economical and efficient techniques for having reliable DLP techniques are increasingly of interest particularly given cases where mirrors have become stuck in one position during operation, obvious limits in DLP technology requiring continuous repositioning and precise alignment of mirrors resulting in required gaps between mirror surfaces which do not reflect light, dimensional limitations of mirrors in traditional DLP systems with the resulting inherent limit to improved pixel resolution, and the continuous desire by users to have improved viewing and operational longevity in their projection systems.

Unfortunately, mirrors have become immovable in certain instances, particularly where capillary water condensation has occurred or where van der Waals forces have resulted. Additionally, as a matrix array of mirrors is not continuous for reflectivity of projected light sources, gaps between mirrors also represent projection gaps in a viewer's projected image causing a "screen door" effect which thereby does not result in a projected image that is robust. The screen door effect is also known as fixed-pattern noise (FPN) and is a visual artifact of a plurality of fine lines that separate the projector's pixels, from the gaps between the mirror edges, which become visible in the projected image on the display screen.

Accordingly, what is needed is an apparatus and system for an optically reflective switching device in a display system which though reduces reliance on precise mirror arrangement and angular mechanical performances, improves resulting projected resolution with enhanced operational reliability while being fixedly positioned in a predetermined state.

SUMMARY OF THE INVENTION

The present invention fulfills these needs and has been developed in response to the present state of the art, and in particular, in response to the problems and needs in the art that have not yet been fully solved by currently available security protocols and technologies.

An optically reflective switching device (ORSD) comprising an optically reflective layer having at least one electrochromic material, a substrate, and an excitation means and controller, wherein said device is a capable of receiving light from a light source and thereafter reflecting said received light in direct response to a reflective state condition of said optically reflective layer, is provided.

An array of a plurality optically reflective switching devices (ORSDs) having an optically reflective layer having at least one electrochromic material, a substrate, and an associated excitation means and controller, wherein each of said devices is a capable of receiving light from a light source and thereafter reflecting said received light in direct response to a reflective state condition of said optically reflective layer, is also provided.

A display system comprising a light source, a plurality of optically reflective switching devices each having an optically reflective layer in contact with a substrate, a circuit means and power source, controller logic, a projection means, and a display means, wherein each of said plurality of devices is a capable of receiving light from said light source and thereafter reflecting said received light in direct response to a reflective state condition of said each device.

The term "optically reflective switching device" is used in embodiment descriptions interchangeably with the term "device" intentionally.

BRIEF DESCRIPTION OF THE DRAWING(S)

Figure 1:
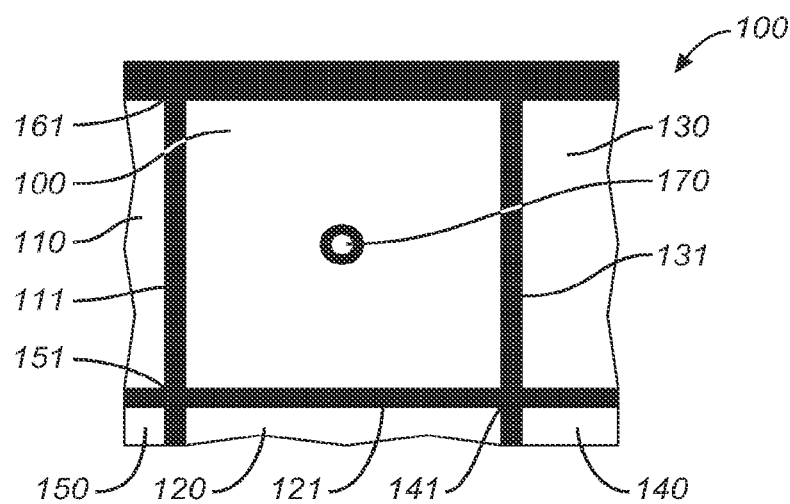

FIG. 1 is a pictorial representation of a mirror in a typical mirror array on a DMD.

Figure 2:
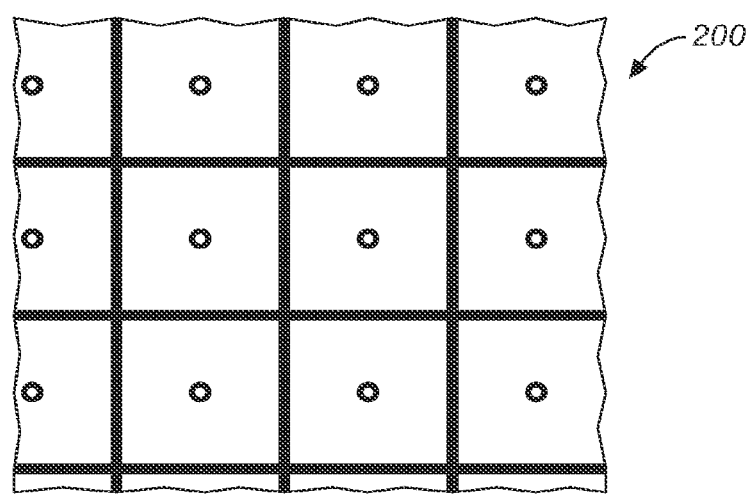
FIG. 2 is a pictorial representation of a larger portion 200 of the mirror array of FIG. 1. A DMD chip typically contains a rectangular array of up to 2 million hinge-mounted mirrors where each of these mirrors is of a dimension less than 20 microns or one-fifth the width of a human hair.

FIG. 2 is a pictorial representation of a larger portion of the mirror array of FIG. 1.

Figure 3:
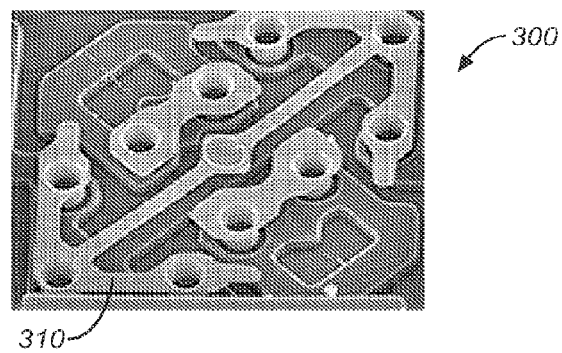
FIG. 3 represents a pictorial representation of the underside of a mirror 300 having a diagonal hinge 310.

FIG. 3 represents a pictorial representation of the underside of a mirror having a diagonal hinge.

FIG. 4 is a cut-away pictorial representation of a mirror on a chip.

FIG. 5 represents a schematic of a typical DLP system.

Figure 6:
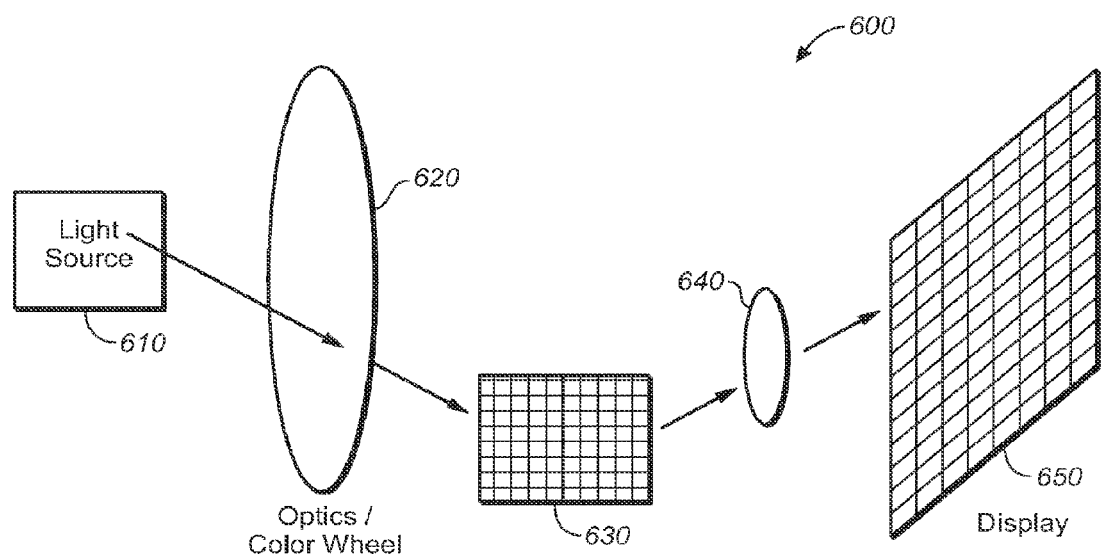

FIG. 6 is a pictorial representation of a traditional projection DLP display system.

FIG. 7 is a pictorial representation of a typical mirror underside having two supports and two electrodes.

Figure 8A:
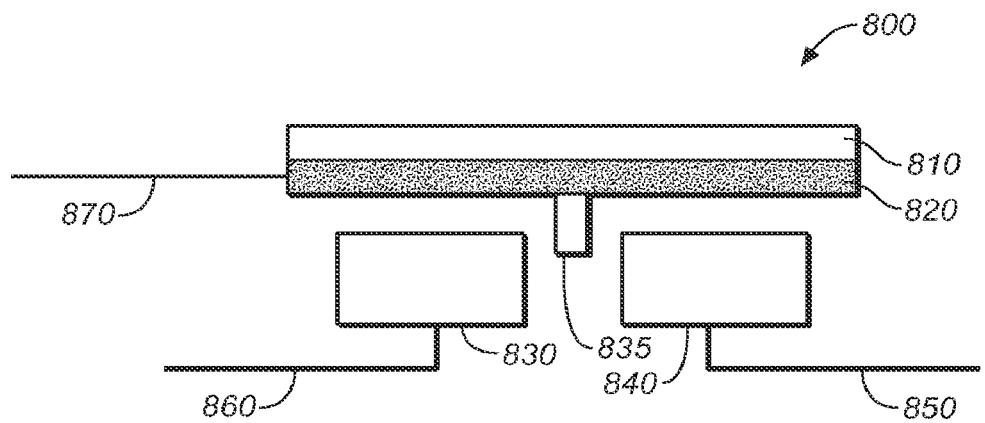

FIG. 8A is a pictorial representation of an optically reflective switching device in accordance with one embodiment of the present invention.

Figure 8B:
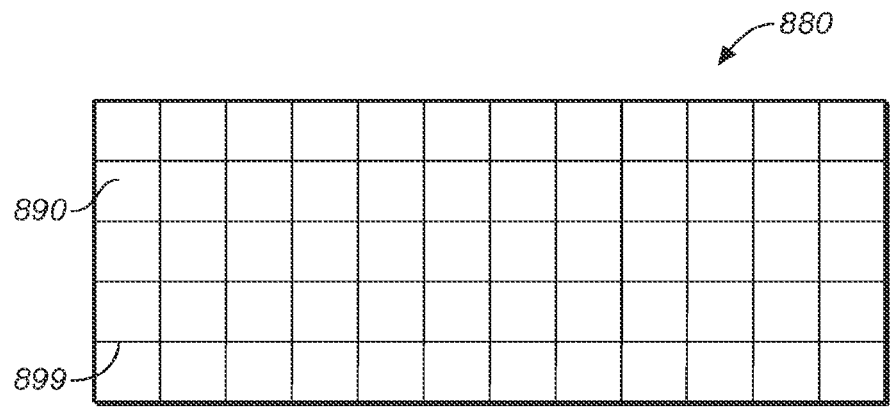

FIG. 8B is a pictorial representation of a face side of a device having an electrochromic composition layer in a typical array of the present invention.

Figure 9:
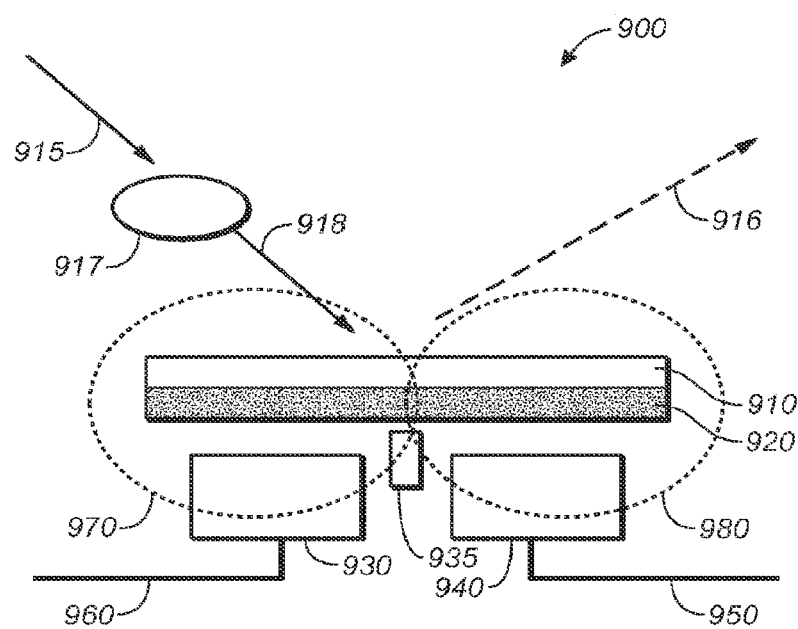

FIG. 9 is a pictorial representation of an optically reflective switching device in an active reflective mode in accordance with one embodiment of the present invention.

Figure 10:
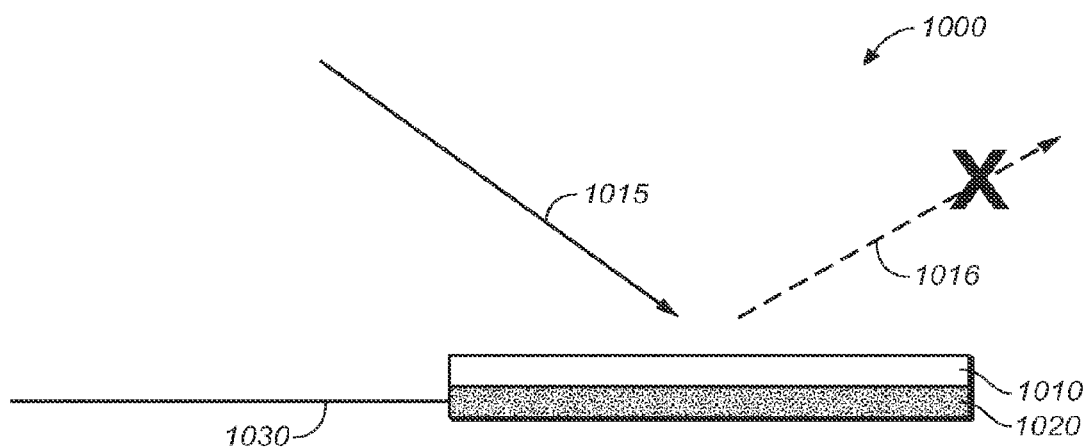

FIG. 10 is a pictorial representation of an optically reflective switching device in an active non-reflective mode in accordance with one embodiment of the present invention.

Figure 11:
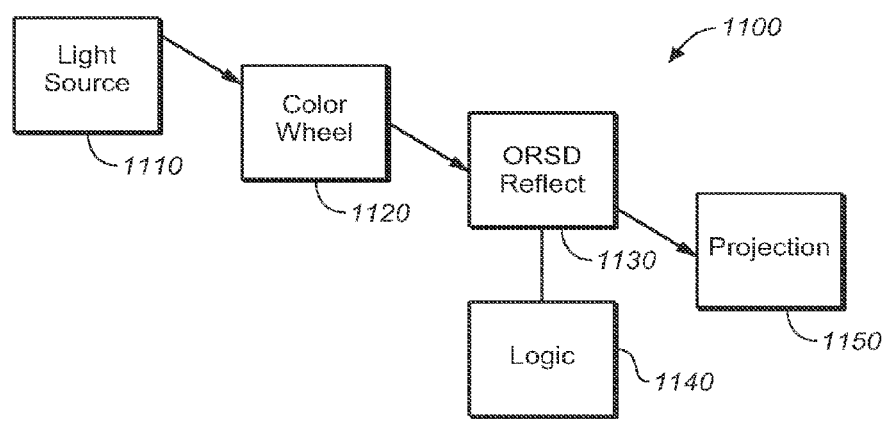

FIG. 11 is a logical schematic of an optically reflective switching device in a display system in accordance with one embodiment of the present invention.

Figure 12:
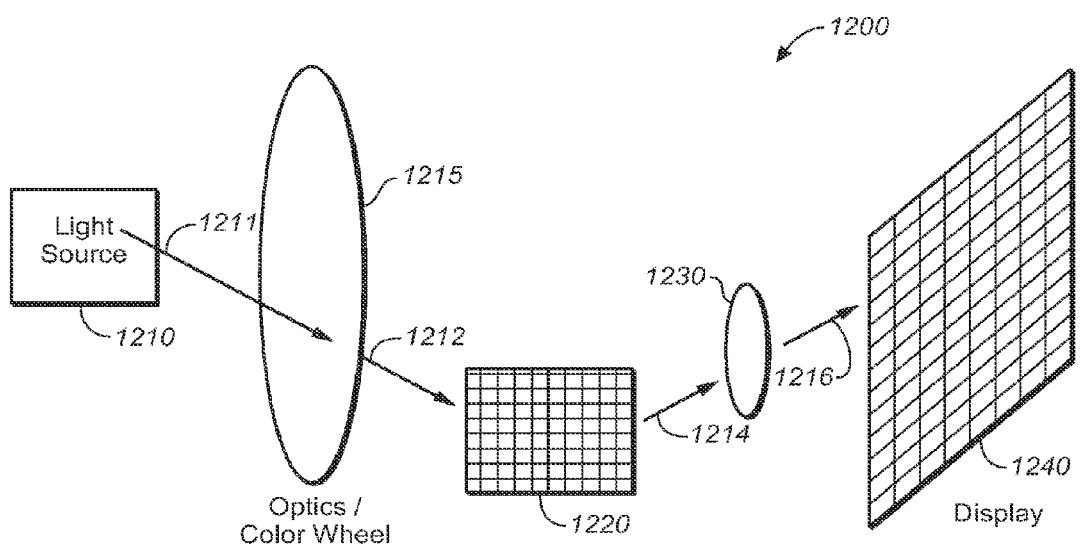

FIG. 12 is an operational flow of a light path for an optically reflective switching device in a display system in accordance with one embodiment of the present invention.

DETAILED DESCRIPTION OF THE ILLUSTRATIVE EMBODIMENTS

The present invention generally relates to the field of high resolution display devices and systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

FIG. 8A is a pictorial representation of an optically reflective switching device 800 in accordance with one embodiment of the present invention. From FIG. 8A, an optically reflective layer 810 having an electrical association as one of an electric field or a current charge is in contact with a substrate layer 820. The substrate layer is positioned above at least one support, not shown, and two electrodes 830 and 840 are optionally shown with associated circuitry 860, 850 for receiving current or commands from a power modulator, printed circuit board (PCB), power source or software, not shown. An electric current, electric field signal or power source 870 is preferably available to supply current or electric field proximate to the device 800 to affect the reflective properties of the optically reflective layer 810.

Preferably the optically reflective layer 810 is comprised of a composition inclusive of one or more materials capable of reversing their reflectivity state when exposed to an electric field or charge current. For instance, electrochromic materials are examples of materials which may appear transparent (i.e., uncolored) when exposed to an electric field or source, and may act as a mirror (i.e. reflective) when they are not exposed to an electric field or source, or vice versa. An example of an electrochromic material is polyaniline which can be formed by electrochemical or chemical oxidation of aniline and used in a film of polyaniline on an electrode. Additional examples include but are not limited to viologens, and polyoxotungstates.

An electrochromic optically reflective layer of the present invention, in a preferred embodiment, may also include a Nickel Magnesium (Ni—Mg) composition in various forms such as a film, whereupon the introduction of an electric current or electric field, a metal-to semiconductor transition takes place, and the film which is otherwise reflective then becomes transparent.

In a further preferred embodiment, the optically reflective layer includes one or more transition metals in combination with Mg which thereby form a layer composition inclusive of but not limited to metals, alloys, hydrides or mixtures of metals, alloys and/or hydrides. Examples of the transition metals usable to create (via one of bonding, mixing, alloying or dissolving with Mg) a layer composition, include Sc, Ti, V, Cr, Mn, Fe, Co, Ni, Cu, Zn, Y Zr, Nb, Mo, Tc, Ru, Rh, Pd, Ag, Cd, La, Hf, Ta, W, Re, Os, Ir, Pt, Au and Hg. When deposited as a film, for example, the layer composition appears mirror-like prior to an application of electric field or charge current.

In a preferred embodiment the optically reflective layer having an electrochromic layer composition and is a film which is one of being laminated, electrochemically deposited, grown on, or otherwise in contact with the substrate, and is exposed to electric fields or currents by the presence of electrodes or power/electric sources (i.e., 870) at predetermined locations.

For example, in certain aspects of various preferred embodiments of the present invention, electrodes may reside: a) between a laminated optically reflective layer and the substrate; b) under the substrate in film or circuitry; c) in one or more supports of the device; d) in or on a hinge under the substrate; or e) in various other configurations as may be readily envisioned by one of ordinary skill so as to permit the electric field or the charge current to be in reasonable proximity to or connectivity with the optically reflective film layer.

In a preferred embodiment, advantageously, when one or more of the electrodes associated with a particular device of the present invention are active, an electric field is created and the transparency of the optically reflective layer is affected to range from a reflective state to one of a transparent state in relation to the electric field present.

In another preferred embodiment, advantageously, when a power source or excitation means (i.e., 870) of the present invention is active, an electric field is created and the transparency of the optically reflective layer is affected to range from a reflective state to one of a transparent state in relation to the electric field present. Where the electric source is of a sufficient amount, the optically reflective layer is transparent (i.e. colorless or uncolored) and no light of an incoming source is reflected. Where the electric source is not of a sufficient amount, the optically reflective layer is reflective (i.e. colored) and light of an incoming source is reflected.

In the operation of a preferred embodiment, since a state change to an optically reflective layer requires an electric field or a current charge, the associated state or color change of an optically reflective layer is affected only when such is applied.

FIG. 8B is a pictorial representation of a face side 890 of a device having an electrochromic composition layer in a typical array 880 of the present invention. The face side 890 of a device in the array 880 has minute spacing 899 between the each device of the array. In a preferred embodiment, the spacing between each device on an array is envisioned to be on the order of less than 20 micrometers.

FIG. 9 is a pictorial representation of an optically reflective switching device 900 in an active reflective mode in accordance with one embodiment of the present invention. From FIG. 9, an optically reflective layer 910 having an electrochromic layer composition is in contact with a substrate layer 920. The substrate layer is positioned above at least one support, not shown, and two electrodes 930 and 940 are shown. Electrodes 930 and 940 are in electrical communication with associated circuitry 960, 950, are for receiving current or commands from a power modulator, or software, not shown, and thereby provide an electric field, at 970 and 980, or electric source (not shown) to the optically reflective layer 910 affecting its reflectivity.

From FIG. 9, the incoming light source 915 is transmitted through a color wheel 917 and the resulting colored light is partly reflected as reflected light at 916 from the optically reflective layer 910 in relation to the electric fields 970, 980 which are generating an electric field or current, thereby causing the optically reflective layer 910 to not be wholly reflective and or of a particular color. Preferably the color wheel 917 is in electrical communication with a controller, not shown, to associate a predetermined color of the color wheel with the incoming light source 915 so as to shine a particular colored light at 918 on a device having a reflective layer 910 at a predetermined time.

FIG. 10 is a pictorial representation of an optically reflective switching device 1000 in an active non-reflective mode in accordance with one embodiment of the present invention. From FIG. 10, an optically reflective layer 1010 having an electrochromic layer composition is in contact with a substrate layer 1020 having circuitry and a power source 1030 to the circuitry. The power source supplies electric current to the layer 1010 via the circuitry of the substrate 1020. From FIG. 10, the incoming light source 1015 is not reflected at 1016 from the optically reflective layer 1010 in relation to the electric fields generated as the layer 1010 is transparent.

In a preferred embodiment, a color wheel, not shown, is in electrical communication with a controller, not shown, to associate a predetermined color of the color wheel with the incoming light source 1015 so as to shine a particular colored light on a device having a reflective layer 1010 at a predetermined time.

FIG. 11 is a logical schematic of an optically reflective switching device in a display system 1100 in accordance with one embodiment of the present invention. A light source 1110, a color wheel 1120, an optically reflective layer on a substrate having a circuit and power source 1130, processor logic (such as but not limited a command logic) 1140, and a projection means such as a projection lens 1150, is set forth. From FIG. 11, as the light source of 1110 passes through the color wheel 1120, a colored light is reflected onto the optically reflective layer of the device and the layer is affected in a predetermined manner by an associated power source and circuitry thereto. In response to the power source controlled by the logic 1140, the optically reflective layer 1130 is either transparent or reflective, as in the predetermined manner, and a resulting colored light is either reflected from the layer 1130 and then projected through the lens 1150 for viewing or is not reflected at 1130. In the system of the present invention, the optically reflective layer and associated substrate is fixedly positioned in an array of a plurality of devices, each having optically reflective layers, substrates, and associated logic.

FIG. 12 is an operational flow of a light path for an optically reflective switching device in a display system 1200 in accordance with one embodiment of the present invention. From FIG. 12, the system comprises a light source 1210, a color wheel 1215, and an array of devices having electrochromic layer compositions 1220, each having logic, not shown, a projection means 1230 and a display means 1240. The light source 1211 of 1210 enters the color wheel 1215 and is emitted at 1212 after passing though the color wheel 1215 as colored light. Preferably the color of the color wheel is determined by a controller associated with the color wheel. The light emitted from the color wheel at 1211 is then received by a device of the present invention which is part of the array of devices 1220. The device receives the colored light of 1212 and then acts to either reflect or not reflect the colored light of 1212 in relation to the transparency of the optically reflective layer of the device. Where the optically reflective layer of the device is reflective (i.e., mirror state) then the received color light is reflected at 1214 to a projection lens at 1230. The projection lens 1230 then passes the received reflected light of 1214 to a display screen 1240 for viewing. Where the optically reflective layer of the device is not reflective (i.e., transparent state), due to the electrical signals affecting the electrochromic properties of the optically reflective layer of the device, then the received color light at 1212 is not reflected and a black color appears in a display screen 1240 at a location in relation to the device's pixel display location on the screen 1240. This process repeats itself thousands of times per second per device by the application of a predetermined electric current or electric field in relation to each device in an array of a display system of the present invention.

A display system of the present invention will vary in the number of devices in an array, where each device has an electrochromic layer composition, substrate and associated electrical source, in view of the resolution sought for a particular system. For instance, the number of devices in an array, and the corresponding size of the resulting array, directly affect and correspond to the resolution of the projected image, such that resolution characteristics are continually increased with larger arrays.

It is envisioned that devices of the present invention may include software, circuitry, firmware, electronics, components on circuits boards, chips on flex, fixedly mounted DMDs, and the like, where applications of the present invention may be used in any display system, device or display means requiring reflection of sourced light and pixel display. Further, many of the associated controller, logic and signals may be performed by a computer program product stored on a computer usable medium comprising one or more of the embodiments herein.

As used herein for the purposes of the present invention, the terms "electric field," "electric current," "charge current," "electric charge," "power source," "excitation means" and "current source" are intended to be used interchangeably and to have a common interpretation.

As used herein for the purposes of the present invention, the term "optical switching device" is the intended to be a general term having a broad meaning in use whereby it may be described in part, but not limited to, as being a mirror, an electronically-controlled switch, an electrically-charged optical switch or any other switching devices that has its ability to switch "ON" or "OFF" determined by an electronic or electrical impulse or signal.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A display system comprising:
   a light source;
   a plurality of optically reflective switching devices each having an optically reflective layer in contact with a substrate, the optically reflective layer capable of being switched from a reflective state to a transparent state;
   a circuit means and power source;
   controller logic;
   a projection means;
   and a display means;
   wherein each of said plurality of devices is capable of receiving light from said light source and thereafter reflecting said received light in direct response to a reflective state condition of said each device and also, in a transparent state condition, receiving light from said light source and thereafter passing said received light through without reflection in direct response to a transparent state condition of said each device.

2. The system of claim 1, wherein said plurality of devices is an array of devices arranged and aligned in a matrix.

3. The system of claim 1, wherein a gap between a device edge and an adjacent edge of an adjacent device in said array is no greater than twenty microns.

4. The system of claim 1, wherein said layer is a film.

5. The system of claim 1, wherein said layer is bonded or grown on said substrate.

6. The system of claim 1, wherein said circuit means is one of a printed circuit board, firmware, software, electrical signal modulator, or integrated circuit.

7. The system of claim 1, wherein said controller logic controls said power source to determine an electrical signal to be supplied to one or more devices of said array at predetermined time.

8. The system of claim 1 further comprising a color wheel.

9. The system of claim 8, wherein said color wheel is controlled concurrently by said controller logic.

10. The system of claim 4, wherein said film includes a transition metal of at least one of Ti, V, Cr, Mn, Fe, Go, Ni, Cu, Zn, Zr, Nb, Mo, Tc, Ru, Rh, Pd, Ag, Cd, Hf, Ta, W, Re, Os, Ir, Pt, Au and Hg, and said film of each device is in one of a first reflective state or a second reflective state in relation to said controller.

11. The system of claim 1, said circuit means is an electrical circuit, said project means is a projection lens and said display means is a display screen.

12. The system of claim 1, wherein said plurality of devices are fixedly arranged and aligned in a matrix format in said array.

13. The system of claim 1 further including an active light source and an active power source controlled by said controller logic.

14. The system of claim 1, wherein said system is usable to receive remotely transmitted imagery for display.

* * * * *